Oct. 11, 1955     P. H. TAYLOR ET AL     2,720,264
APPARATUS FOR BLANKING AND PERFORATING WORK-PIECES
Filed Sept. 19, 1950     6 Sheets-Sheet 1

INVENTORS
Paul H. Taylor and
George F. Wales
BY
Edwin B. Gary
ATTORNEY

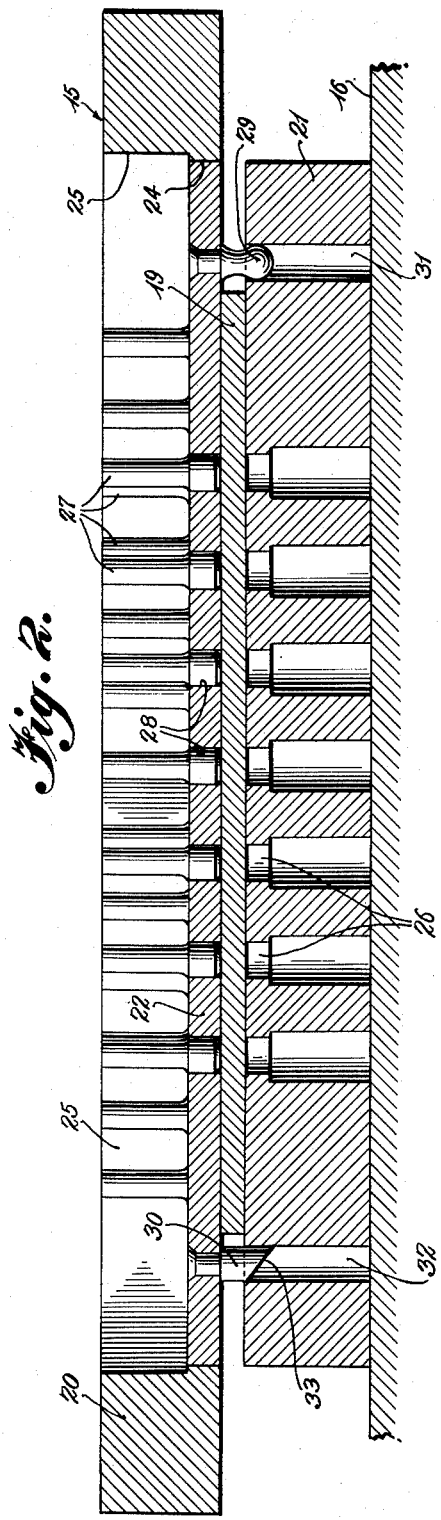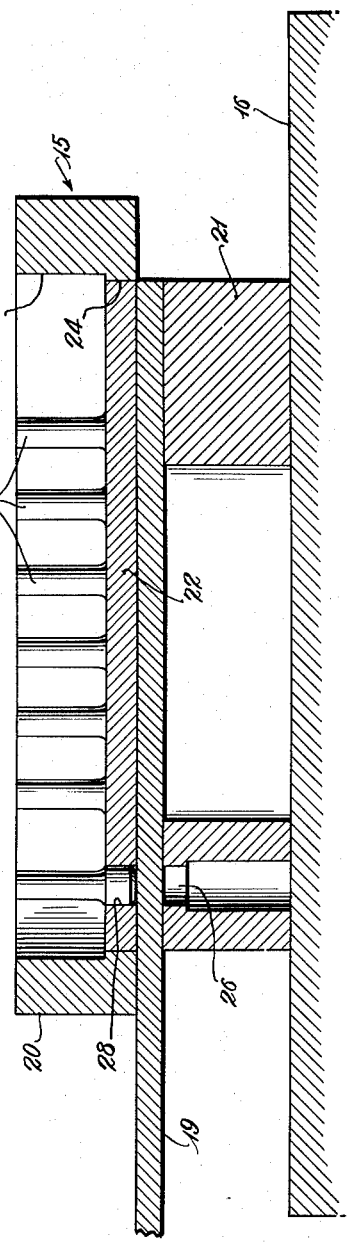

Oct. 11, 1955  P. H. TAYLOR ET AL  2,720,264
APPARATUS FOR BLANKING AND PERFORATING WORK-PIECES
Filed Sept. 19, 1950  6 Sheets-Sheet 3
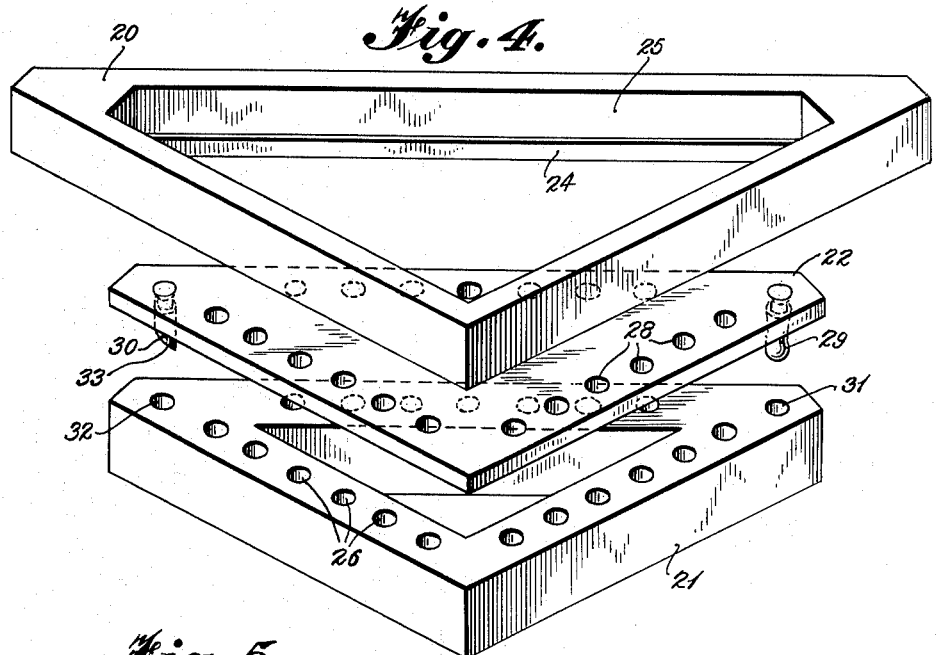
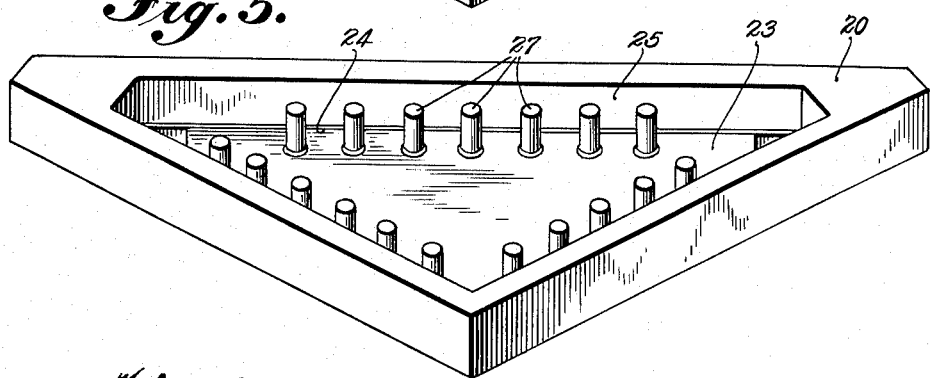
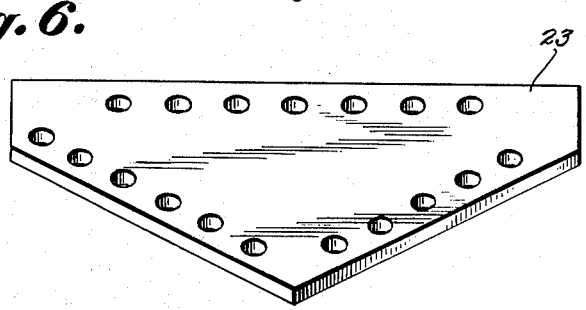
INVENTORS
Paul H. Taylor and
George F. Wales
BY
Edwin B. Gary
ATTORNEY INVENTORS
Paul H. Taylor and
George F. Wales
BY
Edwin B. Gary
ATTORNEY Oct. 11, 1955   P. H. TAYLOR ET AL   2,720,264
APPARATUS FOR BLANKING AND PERFORATING WORK-PIECES
Filed Sept. 19, 1950   6 Sheets-Sheet 5

INVENTORS
Paul H. Taylor and
George F. Wales
BY
Edwin B. Gary
ATTORNEY

Oct. 11, 1955  P. H. TAYLOR ET AL  2,720,264
APPARATUS FOR BLANKING AND PERFORATING WORK-PIECES
Filed Sept. 19, 1950  6 Sheets-Sheet 6

INVENTORS
*Paul H. Taylor* and
*George F. Wales*

BY

*Edwin B. Gary*
ATTORNEY

United States Patent Office 2,720,264
Patented Oct. 11, 1955

2,720,264
APPARATUS FOR BLANKING AND PERFORATING WORK-PIECES

Paul H. Taylor, North Tonawanda, and George F. Wales, Kenmore, N. Y., assignors to Wales-Strippit Corporation, North Tonawanda, N. Y., a corporation of New York Application September 19, 1950, Serial No. 185,601

1 Claim. (Cl. 164—118)

This invention relates generally to the punching of blanks from stock material such as plates, sheets, bars and the like, and more particularly the invention is concerned with a method of, and apparatus for, perforating such blanks as the latter are punched from the stock material.

The features which characterize the present invention may be employed to particular advantage in connection with the punching apparatus and methods disclosed and claimed in George F. Wales' Patents Nos. 2,410,372 of October 29, 1946, and 2,419,862 of April 29, 1947, particularly the former.

Both of the patents referred to are concerned with perforating work-pieces by the use of transfer punches which, in the case of a multiplicity of holes, are driven into, and lodged in, the initial work-piece in the desired pattern. In subsequent repeat operations, the punches are driven out of one work-piece and driven into, and lodged in, another work-piece. Thus, each work-piece in which the punches are lodged serves to hold the punches assembled in the desired relation until they are driven into and lodged into another work-piece, the punches being freed from the original work-piece in which they were lodged as this occurs. There is no necessity, therefore, of collecting the various punches after each punching operation and reassembling them in the desired relation to the work-piece as is the case when the punches are driven entirely through and freed from each work-piece as the holes are formed therein.

Provision is made in each of the said patents for aligning the punches with the cooperating die apertures when a work-piece in which the punches are lodged is placed in the desired relation with respect to a second work-piece to which the punches are to be transferred. In Patent 2,410,372, the means for aligning the punches and die apertures for the purpose contemplated comprises a guide plate, the latter having guide apertures therein through which the punches may pass from one work-piece to the other and which are held in alignment with the die apertures by guide pins which register with suitable guide apertures. In driving the perforating punches into, and lodging them in, a work-piece in the manner described, the force applied to the punches is regulated so that the leading ends of certain, or all, of the punches will project slightly from the far face of the work-piece in which the punches are lodged. Hence, when the punches have been freed from one work-piece and the work-piece into which they have been driven is assembled in the desired relation with respect to another work-piece, the projecting ends of the punches will enter the guide apertures in the guide plate and thus be properly aligned with the die apertures.

Heretofore, work-pieces which have been perforated in the manner described have been, in many instances, blanked from stock material either preliminary to, or subsequent to, the perforating operation. The separate operations involved are costly as a result of the necessity of increased handling of the stock material and work-pieces and the necessity of employing separate apparatus for the different operations involved.

The principal object of the present invention, therefore, is to overcome the above objections, this object contemplating a novel method and apparatus characterized by features which enable the perforation of a work-piece by and in the same operation in which the work-piece is blanked from stock material.

A further object is to provide blanking and perforating apparatus in the form of a self-contained, or unit, assembly which may be employed in connection with conventional presses.

A still further object is to provide a blanking and perforating assembly wherein the blanking die is lodged on a work-piece as the perforating punches are lodged therein, whereby the blanking die and perforating punches are held together as a unit and may be manipulated with facility incident to subsequent operations.

A still further object is to provide a blanking and perforating assembly wherein the parts are simple, inexpensive and of such a design as to insure accurate blanking and perforating of the work-pieces.

The invention is illustrated in the accompanying drawings, wherein:

Figure 2 is an enlarged section taken along line 2—2 of Figure 1;

Figure 3 is a similar section taken along line 3—3 of Figure 1;

Figure 4 is an exploded view showing in perspective the parts of the blanking and perforating assembly;

Figure 5 is a perspective view illustrating a work-piece in and on which the blanking die and perforating punches are lodged, and illustrates an intermediate stage of the blanking and perforating operations;

Figure 6 is a perspective view of a finished work-piece;

Figure 1:
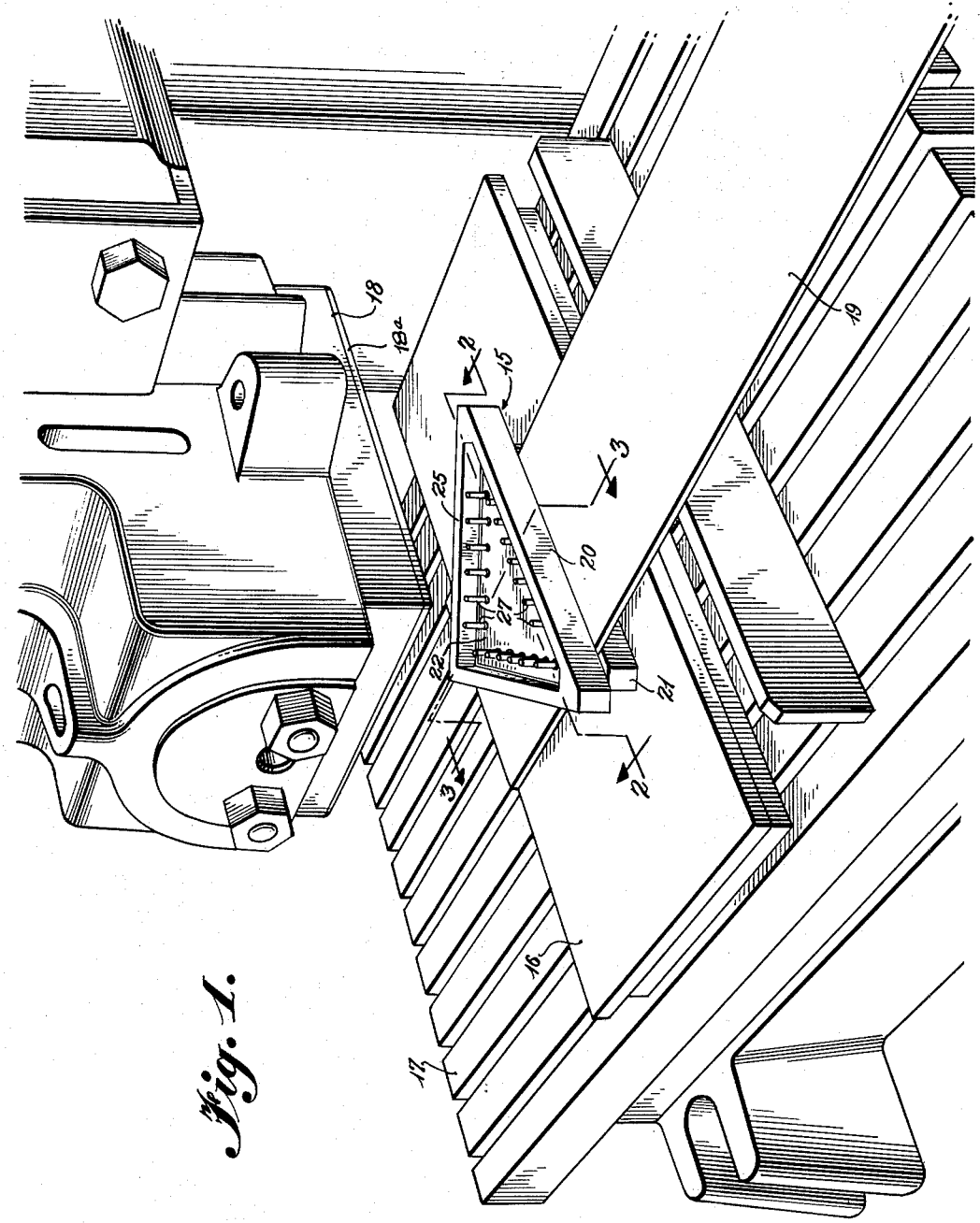
Figure 1 is a perspective view of a blanking and perforating assembly embodying the features of the invention, the assembly being shown in connection with stock material from which blanked and perforated work-pieces are to be produced and in operative relation with respect to the bed and ram of the press by which actuation of the parts of the assembly is to be effected.

A blanking and perforating assembly embodying the features of the invention is indicated at 15 in Figure 1, the assembly, as illustrated, being the form of a multipart unit and being shown supported upon a table 16 carried by the bed 17 of a conventional press under the ram 18 of the press. A hardened ram plate 18a has been attached to the ram 18 to prevent damage from the perforating punches. One end of a strip of stock material 19 from which perforated work-pieces are to be punched is shown introduced between the parts of the blanking and perforating assembly.

As illustrated, the blanking and perforating assembly comprises a blanking die 20, a combined perforating die and blanking punch 21 and a guide plate 22, these parts being shown in perspective in exploded relation in Figure 4. In this connection, it will be noted that all of the parts shown are generally triangular in shape as the perforated work-pieces, one of which is indicated at 23 in Figure 6, to be produced are of such shape. Obviously, square, round, or otherwise shaped work-pieces may be produced, it being understood that, although the shearing edges of the blanking die and blanking punch will conform to such shape, the overall, or outside shape of such blanking elements is not dictated by the shapes of the shearing edges.

The blanking die is formed, or provided, around its inner walls and at the bottom thereof with a shearing edge 24 which is preferably of a greater height than the thickness of the stock material 19, and hence of a greater height than the thickness of the work-pieces to be punched from said material. The shearing edge 24 is of a shape which will produce work-pieces of the desired shape and is extended inwardly, as illustrated, to provide a clearance 25 above the shearing edge.

The combined perforating die and blanking punch 21 corresponds in outline to that of the shearing edge 24 of the blanking die, the side and top walls of the member 21 cooperating with the shearing edge 24 to punch work-pieces from the stock material. The member 21 is also formed with die apertures 26 with which perforating punches 27 (Figure 5) cooperate in perforating the work-piece in the manner described.

The guide plate 22 (Figure 4) has a marginal edge which is adapted to cooperate with the shearing edge 24 of the blanking die 20 so as to guide the latter in proper relation with respect to the perforating die and blanking punch 21 as the blanking members are operated to punch out the work-pieces. The guide plate 22 is also formed with perforations 28 which are adapted to guide the punches 27 in proper relation with respect to the die apertures 26 when the punches are operated to perforate the work-pieces.

In order to maintain the guide plate 22 in proper relation with respect to the perforating die and blanking punch 21, the guide plate carries guide pins 29 and 30, these pins being adapted to enter guide apertures 31 and 32, respectively, in the perforating die and blanking punch 21. When the guide pins 29 and 30 occupy the guide apertures 31 and 32, the guide plate will be maintained in such a position that the blanking die 20, when actuated, will be guided in the desired relation with respect to the cooperating edges of the perforating die and blanking punch 21 while the punches 27 will be guided in the proper relation with respect to the die apertures 26.

Preferably, the lower end of the guide pin 29 is spherical, the major diameter of the sphere being located just below the upper surface of the perforating die and blanking punch when the parts are assembled in operative relation. The spherical end of the guide pin 29 is of substantially the same diameter as the guide aperture 31 while the shank of the guide pin is of substantially less diameter. The guide pin 30, on the other hand, is of substantially the same diameter as its guide aperture 32. However, its lower end is beveled, as indicated at 33, so that at the side of the aperture 32 away from the aperture 31 the full diameter of the pin 30 terminates just below the upper face of the perforating die and blanking punch 21, as best shown in Figure 2. The guide pin construction described has the advantage that in disassembling the parts, the guide plate may be rocked by lifting the end which carries the guide pin 30. When this is done, the spherical end of the guide pin 29 will pivot in the guide aperture 31 while the guide pin 30 readily moves out of the guide aperture 32. The beveled face 33 of the guide pin 30 enables the guide plate to be rocked in the manner described and compensates for the increased increment of length between the pins as the guide plate is rocked. The guide pins 29 and 30 and the manner in which they cooperate with the perforating die and blanking punch to insure the desired cooperation between the punch and die elements is disclosed and claimed in copending application Serial No. 185,603, assigned to our interests.

Figure 7:
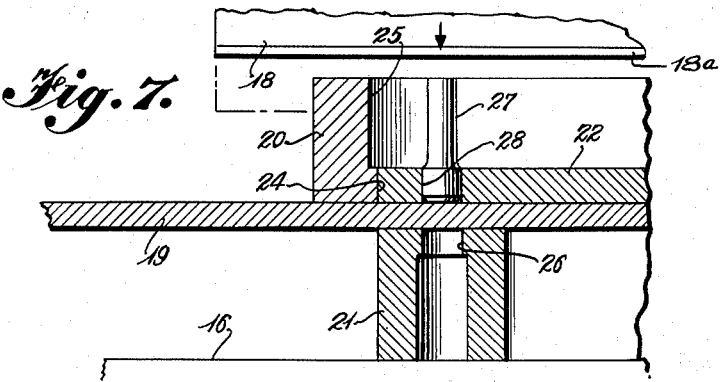
Figure 7 is a fragmentary sectional view illustrating the manner in which the parts are assembled at the outset, the stock material being supported upon the combined perforating die and blanking punch and the blanking die, guide plate and perforating punches being supported upon the stock material.

In carrying out the invention, the end of the stock material 19 is arranged upon the perforating die and blanking punch 21, as shown in Figures 1 and 7. The guide plate 22 is then placed upon the stock material so that the guide pins 29 and 30 enter the guide apertures 31 and 32 in the perforating die and blanking punch 21, it being understood that the width of the stock material 19 is less than the distance between the guide pins and that the path of movement of the stock material is normal to a line between the guide pins. The blanking die 20 is then oriented and fitted over the guide plate so that it will also be supported upon the stock material; and the heads of the perforating punches 27 are inserted in the guide apertures 28 in the guide plate so that they rest upon the stock material.

Figure 8:
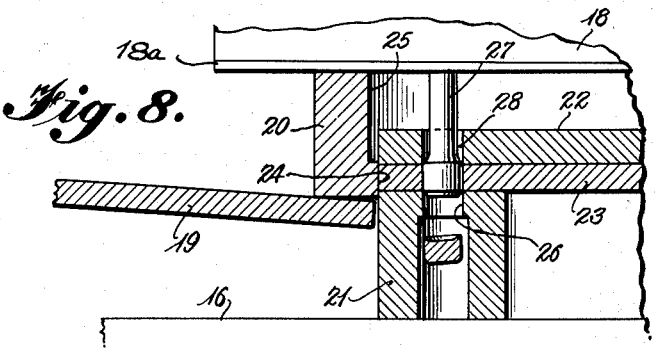
Figure 8 shows the second operation in which the blanking die has been actuated to blank out the work-piece and become lodged thereon, during which operation the perforating punches are driven into, and a short distance through, the work-piece and are lodged therein.

With the parts assembled in the manner described and with the assembly positioned in a press, as illustrated, the ram of the press is actuated to move the blanking die and perforating punches to the positions shown in Figure 8. In the course of such movement, the blanking die punches a work-piece 23 out of the stock material, being moved only far enough, however, so that the shearing edge 24 moves slightly below the lower face of the work-piece. In this position, the blanking die is lodged on the marginal edge of the work-piece. At the same time, the blanking die is punching out the work-piece, the perforating punches are driven into, and lodged in the work-piece, thereby forming a perforation, or any desired pattern of perforations. The perforating punches also are arrested while their heads are still lodged in the work-piece, although, as in the case of the blanking die extending slightly below the lower, or far, face of the work-piece. Upon completion of the operation illustrated in Figure 8, therefore, the blanking die and perforating punches are lodged on and in the work-piece 23 and these parts may be handled as a unit. The unitary assembly of work-piece, blanking die and perforating punches is shown in Figure 5.

In connection with the foregoing, it will be understood that, if desired, the relative heights of the blanking die and perforating punches may be predetermined so that the blanking die may start to punch out the work-piece before the perforating punches start to enter the work-piece, or vice versa. In this way, the initial load on the press may be reduced substantially, although if this factor is immaterial the initial movements of the blanking die and perforating punches may occur simultaneously.

Figure 9:
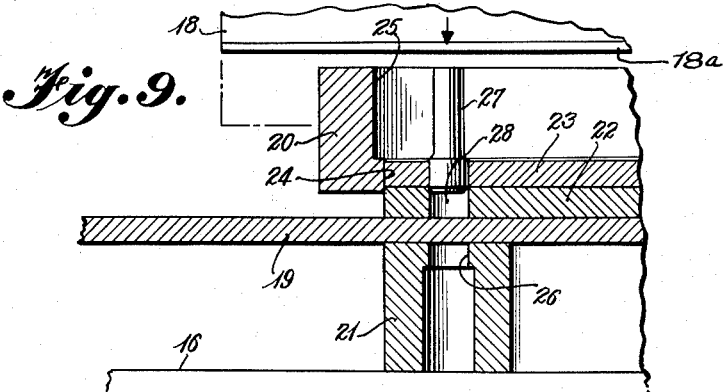
Figure 9 illustrates the manner in which the work-piece which carries the blanking die and perforating punches has been removed from under the guide plate and placed on top of the latter after the stock material has been advanced upon the perforating die and blanking punch and the guide plate has been placed upon the stock material.

Upon completion of the operation illustrated in Figure 8, the ram of the press is elevated. Thereupon the work-piece 23 and the blanking die 22 are removed and the stock material is advanced to position a new section over the perforating die and blanking punch 21, as shown in Figure 9. The guide plate 22 is then again placed on top of the stock material with its guide pins 29 and 30 entering the guide apertures 31 and 32 in the combined perforating die and blanking punch 21. The work-piece which has been punched out of the stock material in the manner described and which at this stage carries the blanking die and perforating punches is then placed upon the guide plate so that the shearing edge 24 of the blanking die overlies the upper marginal edge portions of the guide plate 22 and so that the heads of the perforating punches 27 enter the guide apertures 28 in the said plate.

Figure 10:
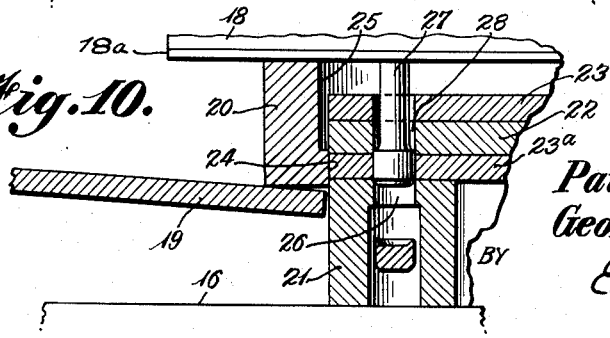
Figure 10 shows the blanking die and perforating punches after they have been freed from the original work-piece and driven to new positions to punch out a second work-piece and in so doing lodge the blanking die on the second work-piece while perforating the latter and lodging the perforating punches therein.

When the parts have been arranged as described, the ram of the press is operated to move the blanking die 20 and the perforating punches 27 to the positions shown in Figure 10. As they are moved to such positions, the blanking die is freed from the original work-piece 23 and punches out and becomes lodged on a second work-piece 23a. At the same time, the heads of the perforating punches 27 are driven in the work-piece 23a. As the blanking die and perforating punches are moved to the positions described, the original work-piece moves into the clearance 25 while only the reduced shank portions of the perforating punches 27 occupy the perforations formed in the work-piece 23 by the heads of the perforating punches. The work-piece 23 and the guide plate 22 may, therefore, be readily removed so that the sequence of operation described may be repeated.

Figure 11:
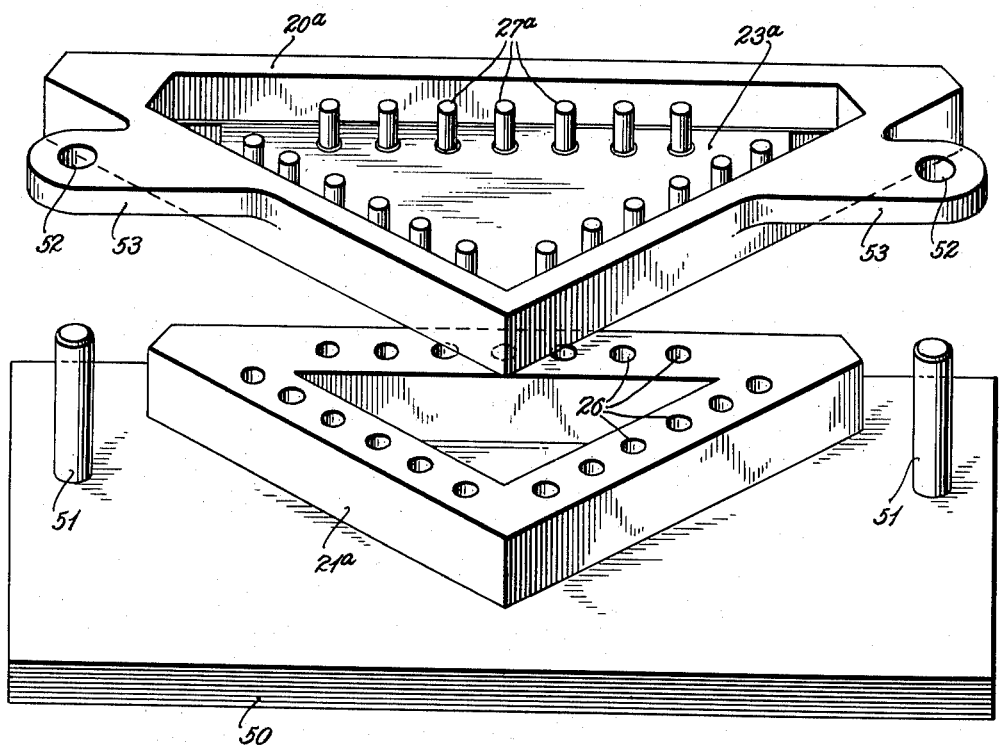
Figure 11 is an exploded view in perspective of a blanking and perforating assembly which is so designed that the guide plate illustrated in the embodiment shown in Figures 1 through 9 may be eliminated.
Figure 12:
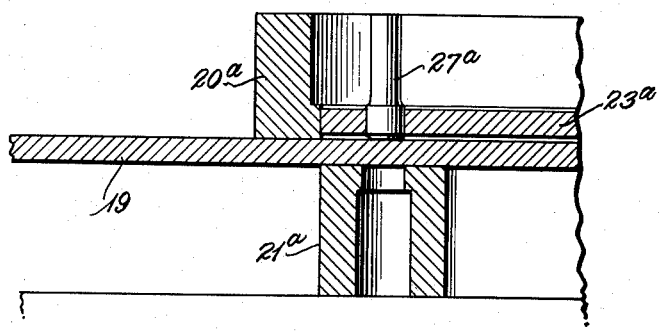
Figure 12 is a fragmentary sectional view illustrating the manner in which a work-piece is employed to guide the perforating punches in the desired relation with respect to the perforating die so as to avoid the necessity of a guide plate for this purpose.

A modified form of blanking and perforating assembly is shown in Figures 11 and 12. In this embodiment provision is made for eliminating the guide plate after the first blanking and perforating operation. To this end, the blanking die 20a is provided with ears 53 in which guide apertures 52 are formed. The latter accommodate guide posts 51 which are carried by a base 50 to which the combination blanking punch and perforating die is attached. The posts 51 and the apertures 52 which accommodate the posts guide the blanking die 20a in accurate alignment with the blanking punch 21a. Hence, after the first work-piece has been perforated, the perforated guide plate 22 (illustrated in connection with the first embodiment) may be eliminated and the work-piece 23a (Figures 11 and 12) in which the punches have been lodged may be employed as the guiding means for the punches 27a. This embodiment has the advantage that it is adapted to higher production runs when the additional time required for removing the guide plate may be objectionable.

While the guide posts 51 have been illustrated as standard straight pins, it will be apparent that guide pins such as those previously described may be employed and that, if desired, suitable ball bushings may be availed of to reduce friction between the guide posts and guide apertures and eliminate the tendency to cock between mating sliding ports.

Figure 13:
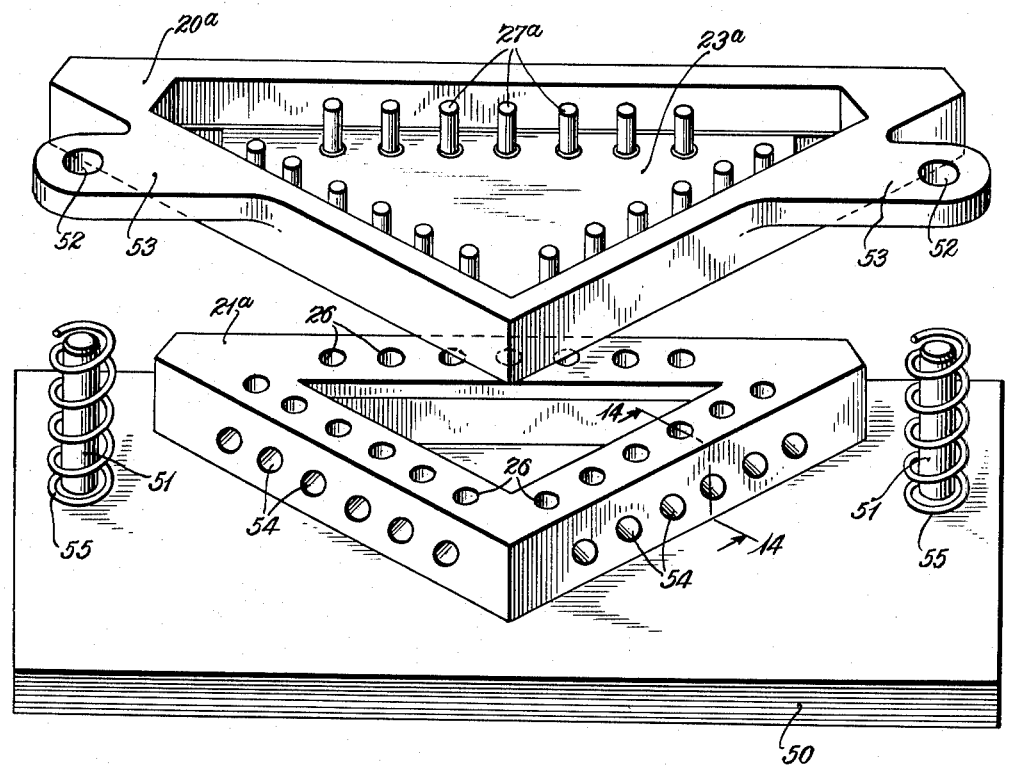
Figure 13 is an exploded view in perspective of a modified form of the assembly shown in Figure 11.
Figure 14:
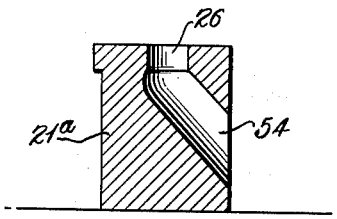
Figure 14 is an enlarged fragmentary section taken along line 14—14 of Figure 13.

Figure 13 is a modified form of the apparatus illustrated in Figure 11. The apparatus illustrated in the former figure includes lifting springs 55 which are arranged on the guide posts 51 and which are operative to separate the die elements after each operation of the press and to normally hold the blanking die elevated so that the strip stock from which the work-pieces are to be produced may be fed step-by-step between the die elements. The work-pieces may be lifted out of the blanking die after the punching operations without the necessity of handling a guide plate in the manner heretofore described. In this embodiment, slug clearance holes 54 (Figure 14) are preferably formed in the perforating die member as the latter is not removed for reassembly after each blanking and perforating operation.

It will be apparent from the foregoing that after the blanking die and perforating punches have been lodged on and in the initial work-piece in the manner described, each subsequent operation of the press will be utilized to strip the blanking die and perforating punches from one work-piece while punching out and perforating a succeeding work-piece and in so doing lodging the blanking die and perforating punches on and in the succeeding work-piece. The method and apparatus described, therefore, have the advantage that the blanking die and perforating punches are always maintained assembled in the relation in which they are employed, each work-piece serving temporarily as a holder, or template, for the blanking die and perforating punches. In this connection, it will be understood that the guiding surface provided by the marginal edge of the guide plate and the apertures formed therein are adapted to permit free movement of the guided parts without any binding action.

It is also to be understood that the work-piece which has been illustrated is intended merely by way of example as the invention contemplates the blanking out and perforating of work-pieces of various sizes and shapes from various sizes and shapes of stock material.

We claim as our invention:

Punching apparatus for use with a press having a bed and a ram and in which the ram has a limited punching stroke, said punching apparatus comprising a portable female blanking die which is freely movable independently of said press and is unattached thereto and which has an axially extending, internal marginal wall having front, rear and side portions, a shearing edge formed on one end of said marginal wall on said front and rear portions, and a clearance space beyond the other end of said marginal wall on said front and rear portions, a male blanking punch which is provided with a plurality of punching die apertures and which has marginal shearing edges adapted to cooperate with the shearing edges of said blanking die, a portable guide plate which is freely movable independently of said press and which fits removably within said marginal wall with a sliding fit and which is provided with a plurality of guiding apertures equal in number to the number of die apertures in said blanking punch and axially aligned therewith, when said guide plate is positioned within said marginal wall, said guiding apertures being adapted to receive and hold perforating punches for cooperation with said die apertures, and interengaging means on said guide plate and said blanking punch adjacent said marginal wall side portions for aligning said guide plate axially with said blanking punch between which the work is adapted to be positioned, said marginal wall and said guide plate being of such thickness relative to the punching stroke of said ram that a blank upon being punched and perforated will lodge in said wall and on said perforating punches, and said guide plate will be moved into the clearance space of said blanking die.

References Cited in the file of this patent

UNITED STATES PATENTS

| Number | Name | Date |
|---|---|---|
| 392,886 | Shimer | Nov. 13, 1888 |
| 1,309,157 | Stockman | July 8, 1919 |
| 1,571,672 | Jayne | Feb. 2, 1926 |
| 1,618,453 | Lichter | Feb. 22, 1927 |
| 2,371,565 | Whistler et al. | Mar. 13, 1945 |
| 2,410,372 | Wales | Oct. 29, 1946 |
| 2,419,862 | Wales | Apr. 29, 1947 |
| 2,494,018 | Urquhart | Jan. 10, 1950 |